FIG. 2A.

Sept. 24, 1963    J. H. BURNETT    3,105,180
MOTOR CONTROL SYSTEM
Filed Aug. 18, 1960    5 Sheets-Sheet 4

FIG. 3.

INVENTOR.
J. H. BURNETT
BY
HIS ATTORNEY

Sept. 24, 1963 J. H. BURNETT 3,105,180
MOTOR CONTROL SYSTEM
Filed Aug. 18, 1960 5 Sheets-Sheet 5

FIG. 4.

INVENTOR.
J. H. BURNETT
BY
HIS ATTORNEY

United States Patent Office 3,105,180
Patented Sept. 24, 1963

3,105,180
MOTOR CONTROL SYSTEM
James H. Burnett, Pasadena, Calif., assignor to
Electrons, Inc., Newark, N.J.
Filed Aug. 18, 1960, Ser. No. 50,526
23 Claims. (Cl. 318—138)

The present invention relates to a system for controlling an alternating current motor, and more particularly to a servo system for controlling the speed of an induction motor by varying the frequency of the voltage applied to the motor windings.

In installations where alternating current induction motors offer advantages over other types of motors, and where it is necessary to adjust the speed of the motor over its entire range, it is desirable to use a system for varying the frequency of the applied voltage to control the speed of the motor. In these adjustable frequency control systems, it is necessary not only to insure that the control frequency is reliably regulated, but also the voltage applied to the windings of the motor should change proportionately with the change in frequency to maintain substantially a constant airgap flux to develop the rated torque of the motor over its entire range of speed.

Heretofore, in frequency control systems that have been proposed, frequency converters, such as wound rotor induction generators, which were driven by adjustable speed D.C. motors, and a voltage regulator to change the applied voltage with the frequency were used. It is evident that these systems involve heavy and bulky machinery which require frequent maintenance, and were entirely impractical in servo systems for controlling motors of relatively small size.

One of the objects of the present invention is to provide an improved servo system for an alternating current motor which will control the speed of the motor in a smooth or stepless manner.

Another object of this invention is to provide an improved system for controlling an alternating current motor by varying the frequency of the voltage applied to the motor windings.

Another object of this invention is to provide a control system for an induction motor wherein a substantially constant torque of the motor will be maintained over the entire range of speed.

Another object of this invention is to provide a servo system for an induction motor which will maintain the motor speed at the controlled rate even though the load changes.

Still another object of this invention is to provide a servo system for controlling the speed of an induction motor by varying the applied frequency, which frequency is governed by a feedback voltage taken in series with one winding of the motor.

A further object of this invention is to provide a transistorized servo system for controlling the speed of an induction motor by varying the applied frequency, which provides overvoltage protection to transistors in the system.

A still further object of this invention is to provide a servo system of the character described for controlling the speed of an induction motor by varying its frequency, wherein the system is operated from an alternating source of energy that is single phase and a fixed frequency.

A still further object of this invention is to provide a servo system of the character described, which is relatively compact, light in weight, and is reliable in operation.

Other objects of this invention will become apparent from the specification, the drawings, and the appended claims.

In the illustrated embodiment of this invention a two phase variable speed alternating current induction motor is controlled from a single phase alternating current supply source. The windings of the motor are energized by a pair of inverters or square wave oscillators. Each oscillator is comprised of a power bridge, across one diagonal of which a motor winding is connected, and is also comprised of a saturable reactor, which is controlled by the power bridge to cause the bridge to furnish full wave voltage pulses of the desired frequency and voltage for energizing its respective motor winding. A phase locking circuit connects the reactors in the square wave oscillators to insure that the full wave voltages applied to the windings are maintained 90° out of phase relative to one another.

The frequency and the amplitude of the voltage applied to the motor windings by the square wave oscillators is controlled by the level of an automatically adjustable direct current voltage from the output of a single controlled full wave bridge rectifier that is applied to the other diagonal of the bridge portion of each square wave oscillator.

The level of this direct voltage output from the controlled bridge rectifier is governed by the output voltage pulses from a feedback circuit which includes a pair of saturable reactors which are connected in master and slave relationship. Each of these saturable reactors, which is capable of delivering half wave output pulses, are connected relative to each other in such a manner that their pulses are 180° out of phase relative to one another, thereby providing a full wave voltage to the controlled bridge rectifier. The power for the controlled bridge rectifier is supplied from the alternating voltage line source, and the output voltage from the master and slave saturable reactors controls the level of the direct current voltage output from the controlled bridge rectifier to the square wave oscillators.

In the feedback circuit for controlling the output of the master and slave saturable reactors, an alternating current feedback voltage is obtained across a resistor that is connected in the power bridge of one square wave oscillator, which resistor is connected in series with the associated motor winding. This alternating voltage is rectified and connected to a potentiometer that serves as a sensitivity control to apportion the feedback voltage to a speed control potentiometer. The A.C. line voltage is rectified to provide a direct current reference voltage that is also connected to the speed control potentiometer. The polarities of the feedback voltage and the reference voltage are in opposition or subtractive relationship to provide a difference voltage that is amplified by a D.C. amplifier. The level of the output from the amplifier controls the output of the master and slave saturable reactors.

Referring to the drawings by numerals of reference, 10 denotes a motor having windings 12 and 14 respectively. Winding 12 is connected across output wires or conductors 16 and 17 of a square wave oscillator 18, and winding 14 is connected across output wires 19 and 21 of a square wave oscillator 20.

The oscillator 18 has a bridge circuit portion which includes four power switching transistors 22, 23, 24 and 25, and four diodes 28, 29, 30, and 31, each of which is connected across the collector emitter of a respective switching transistor 22 through 25. The oscillator 20 has a bridge circuit portion which includes four power switching transistors 32, 33, 34, and 35, and four diodes 38, 39, 40, and 41, each of which is connected across the collector emitter of switching transistor 32 through 35, respectively. The output wires 16 and 17 are connected across one diagonal of the bridge circuit portion of the oscillator 18, and the output wires 19 and 21 are connected across one diagonal of the bridge circuit portion of the oscillator 20. Input wires 44 and 46 to the oscillators 18 and 20 are connected across the other diagonal of the bridge circuit portions of the oscillators 18 and 20, respectively. The oscillator 18 has a saturable reactor portion 50 that includes a primary winding 52, and secondary windings 54, 55, 56, and 57. The oscillator 20 has a saturable reactor portion 60 that includes primary windings 62 and 63, and secondary windings 64, 65, 66, and 67.

In the oscillator 18, there is a resistor 70 which is connected to the output wire 16 in series with winding 12 of the motor 10. The voltage drop across the resistor 70 provides a feedback voltage as will be more fully described hereinafter.

In the oscillator 20, one end of the primary winding 62 is connected by a wire 72 to a tap 73 on the primary winding 52. The other end of primary winding 62 is connected by a wire 74 to the output wire 19 of the oscillator 20. The primary winding 63 of oscillator 20 is connected at one end by a wire 75 to a tap 76 on the primary winding 52 of the oscillator 18. The other end of the primary winding 63 is connected by a wire 77 to the output wire 21 of the oscillator 20. This connection of the windings of the saturable reactor portions 50 and 60 maintains the voltage across output wires 19 and 21 of oscillator 20, 90° out of phase with the voltage across the output wires 16 and 17 of the oscillator 18, as will be described in connection with the operation of this system, thus keeping the voltages in the windings 12 and 14 of the motor 10 in phase quadrature.

The input wires 44 and 46 to the oscillators 18 and 20 are connected across one diagonal of a controlled bridge rectifier 80; and a supply of single phase alternating current, denoted at 82, is conducted through an overvoltage protection device 84 to the other diagonal of the controlled bridge rectifier 80 over input wires 86 and 88.

The bridge rectifier 80 has a pair of gatable tetrode PNPN solid state devices or power transistors 90 and 92 connected across wires 86 and 46, and 86 and 44 respectively, in adjacent arms of the bridge 80. Diodes 94 and 96 are connected in the bridge 80 across wires 88 and 46, and 88 and 44, respectively, in adjacent arms of the bridge. Diodes 98 and 100 are connected between one side of the gating transistor 90 and wire 86, and between one side of the gating transistor 92 and wire 44 respectively. The gating of the transistors 90 and 92 controls the conduction of the line voltage from the source 82 through the bridge circuit 80 and also controls the level of the rectified voltage across the input wires 44 and 46 to the oscillators 18 and 20.

When there is substantially no voltage applied to the input wires 44 and 46, the windings 12 and 14 of the motor 10 are deenergized. When a low level of direct current voltage across wires 44 and 46 is present a relatively low frequency and voltage is applied to the windings 12 and 14. As the direct current voltage level across wires 44 and 46 increases, the frequency and the voltage in the windings 12 and 14 increases.

A filter choke 104 smooths out the direct current voltage across wires 44 and 46; and ground connections 105 and 107, with capacitors 108 and 109 connected between wires 44 and 46 and the respective ground connections, serve to ground any transients which may occur in the input circuit to the oscillators 18 and 20.

The frequency and voltage in the motor windings 12 and 14 as controlled by the level of the direct current voltage across input wires 44 and 46 of the oscillators 18 and 20 will now be discussed relative to the operation of the oscillator 18.

Figure 1:
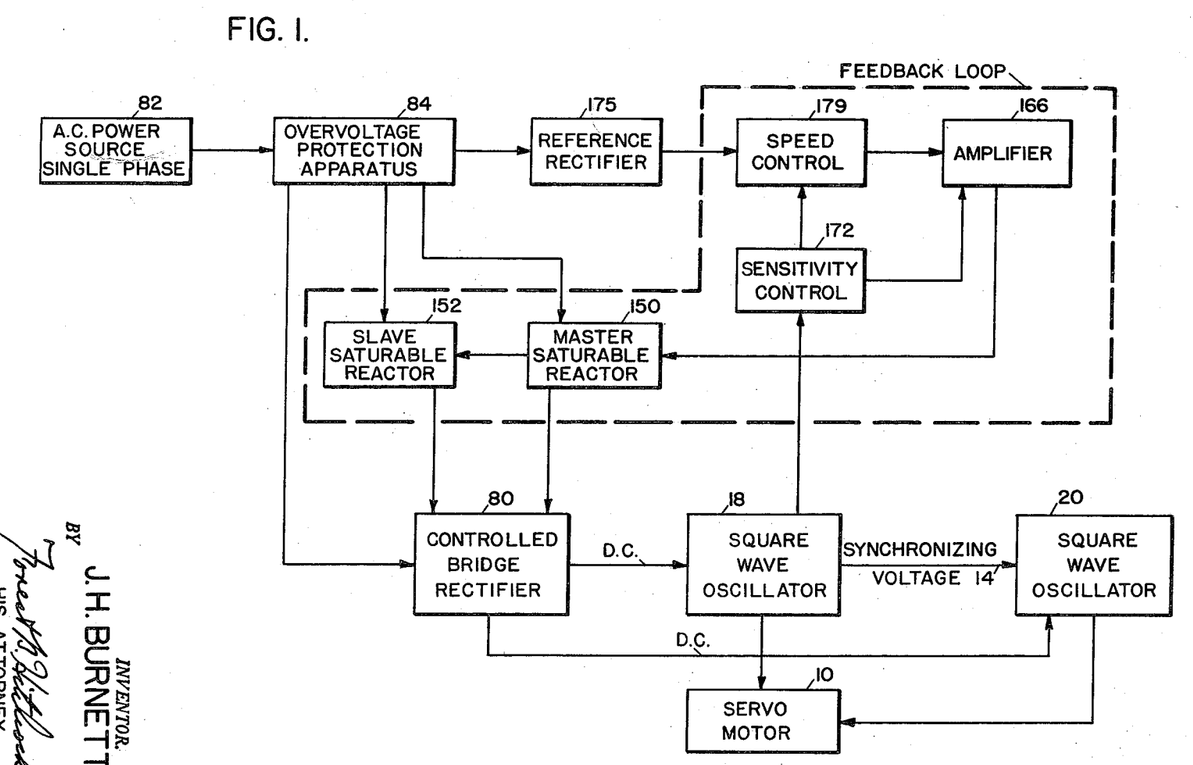
FIG. 1 is a block diagram of a control system constructed according to the embodiment of this invention.
Figure 2A:
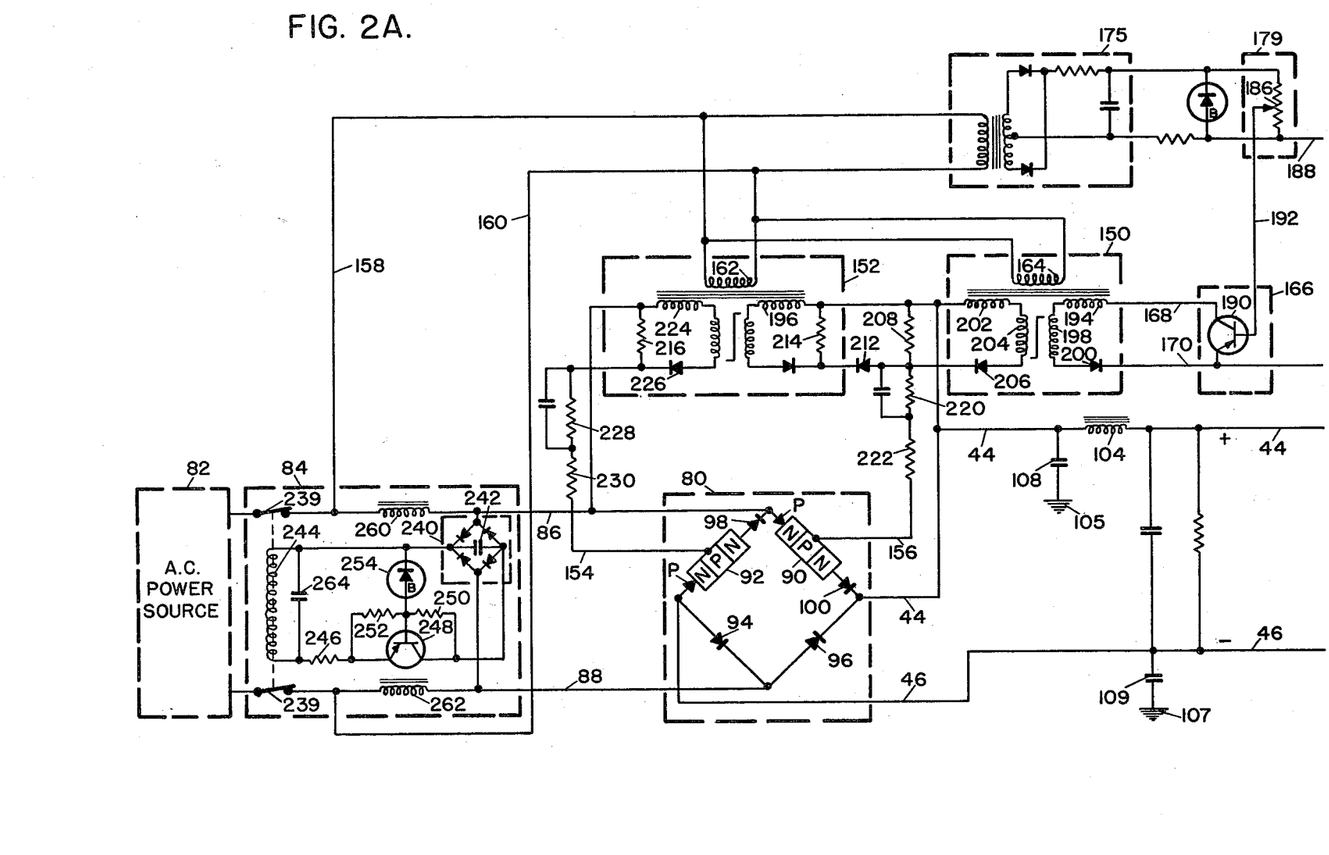
FIGS. 2A and 2B when placed side by side is a typical circuit arrangement of the system.
Figure 2B:
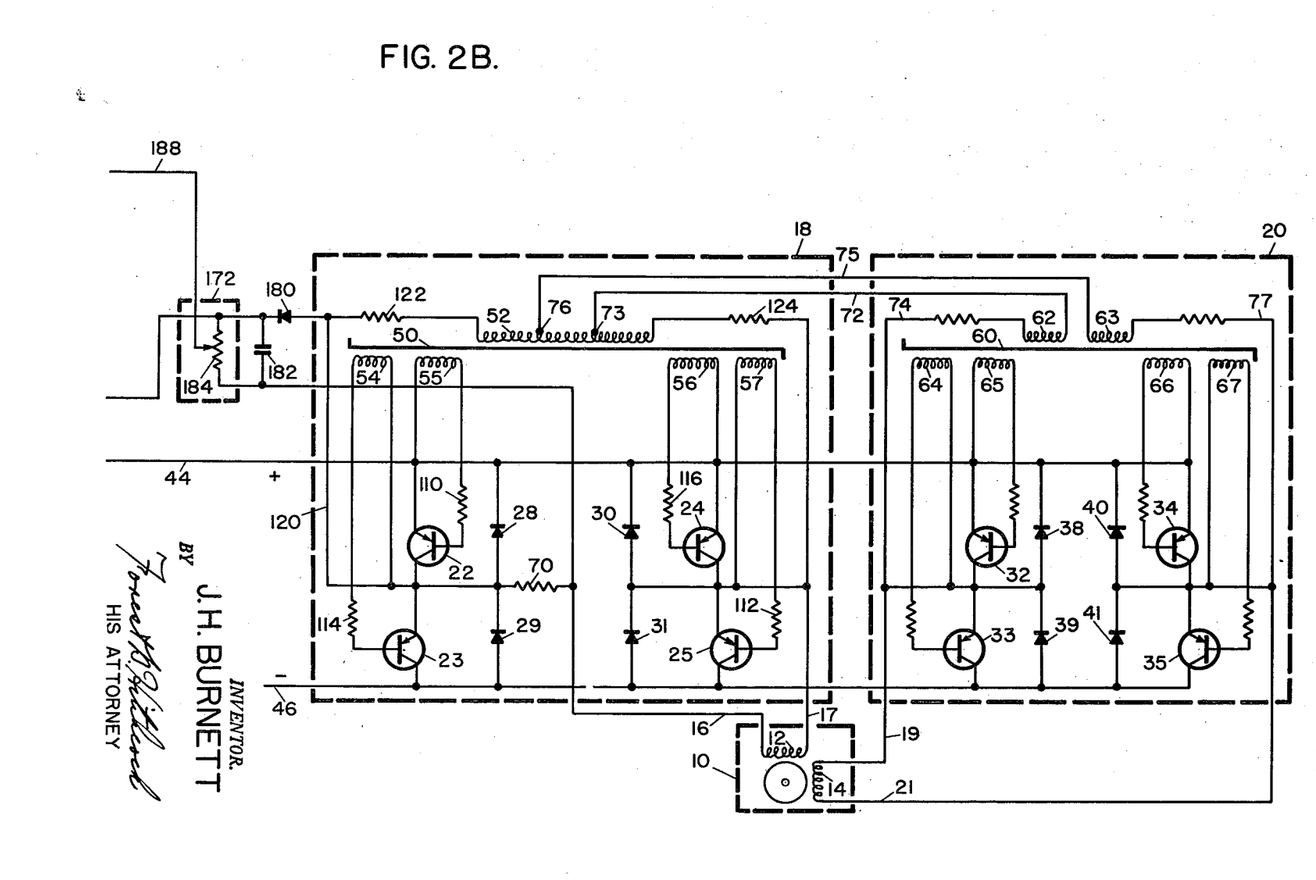

In FIGS. 2A and 2B wire 44 is shown as positive, and wire 46 is shown as negative. The transistors 22 and 25, the resistor 70, and the motor winding 12 are connected across the wires 44 and 46 by a circuit which extends from wire 44 and includes the emitter collector terminals of the transistor 22, the resistor 70, winding 12 of the motor, and the emitter collector terminals of transistor 25 to the wire 46. The transistors 23 and 24 are also connected in series with the motor winding across the wires 44 and 46 by a circuit which extends from wire 44 and includes the emitter collector terminals of the transistor 24, the wire 17, the winding 12 of the motor, the wire 16, the resistor 70, and the emitter collector terminals of the transistor 23 to the wire 46. The circuit for biasing the base of the transistor 22 extends from the wire 44 and includes the secondary winding 55, and a current limiting resistor 110. The circuit for biasing the base of transistor 25 extends from the wire 17 and includes the secondary winding 57, and a current limiting resistor 112. Similarly the biasing circuits for the base of the transistors 23 and 24 include the secondary winding 54 and a current limiting resistor 114, and the secondary winding 56 and a current limiting resistor 116 respectively. When the bases of the transistors 22 and 25 are biased more negatively than their respective emitters, the transistors 22 and 25 will conduct. When the bases of the transistors 23 and 24 are biased more negative than their respective emitters the transistors 23 and 24 will conduct. When a voltage first appears across the wires 44 and 46, and assuming that a natural unbalance is in the circuit, so that the bases of the transistors 22 and 25 are more negative than their respective emitters at this first instance, the transistors 22 and 25 will cause current to flow through the winding 12 in one direction by means of the previously described circuit. Simultaneously a voltage of the same polarity is conducted through the primary winding 52 which is connected in parallel with the winding 12 of the motor, by a circuit which extends from the collector terminal of the transistor 22 and includes wire 120, resistor 122, the primary winding 52, resistor 124, and the wire 17. Because the voltage drop across the emitter to collector terminals of the transistors 22 and 25 is negligible, the voltage in the motor winding 12 is substantially at the same level at the voltage across wires 44 and 46. The voltage induced in the primary winding 52 of the saturable reactor portion 50 saturates the core in a certain number of volt seconds depending upon the level of the applied voltage. During the saturation of the core of the reactor 50, a small control voltage which may be as little as 10% of the voltage appearing across the wires 44 and 46 is induced in the secondary windings 54, 55, 56 and 57. These windings are so connected that voltages of opposite polarities are induced in the biasing circuits of transistors 22 and 25, and 23 and 24 simultaneously. When the biasing voltage in the secondary coils 55 and 57 decays to zero, the transistors 22 and 25 cease conducting and the over-shoot of the voltage in the secondary windings 55 and 57 causes a bias in the windings 54 and 56 to bias the bases of the transistors 23 and 24, respectively, more negative than their emitters so that the transistors 23 and 24 commence conducting. The conduction of the transistors 23 and 24 causes a current to flow in the opposite direction through the winding 12, and simultaneously in the opposite direction through the primary winding 52 by means of the previously described circuit.

During the switching interval diodes 28 and 31 conduct current back to the buses 44 and 46 to dissipate the current in winding 12. The voltage of opposite polarity in winding 52 induces a voltage of the same polarity in secondary windings 54, 55, 56 and 57. The induced voltage in windings 54 and 56 build up a bias to cut off the conducting transistors 23 and 24, and the overshoot causes a voltage of proper polarity to bias the transistors 22 and 25 so that they commence conducting. During this switching interval diodes 29 and 30 dissipate the current in winding 12. Thus, an alternating current is caused to flow in the winding 12, the frequency of which is dependent upon the switching of the transistors 22 and 25 and the transistors 23 and 24. The voltage level applied to the primary winding of the transformer 52 governs the rapidity of the switching of the transistors 22 and 25, and 23 and 24 to their alternate "off" and "on" conditions, thus determining the frequency of the voltage in the motor winding 12. To summarize, the alternate conduction of the diagonally opposite pairs of the transistors in the oscillator 18 causes alternating current to flow in the winding 12 of the motor and also causes voltage of opposite polarities to be supplied alternately to the primary winding 52 which induces the proper biasing voltages in the base circuits of the transistors to drive them from a conductive to a nonconductive state and vice versa. During the switching intervals the diodes 28, 29, 30 and 31 conduct current back to the buses or wires 44 and 46 to more quickly dissipate the decaying inductive current in the winding 12 and improve the switching time of the transistors. The level of the D.C. voltage controls the saturation time in each half cycle of the cores of the reactor portion 50 thus controlling the switching time of the transistors and thus the frequency in the motor winding 12; and because there is little emitter to collector resistance in the switching transistors, the amplitude of the voltage in the winding 12 is substantially identical to the D.C. voltage to the input of the oscillators 18 and 20.

The switching transistors 32, 33, 34 and 35 in the oscillator 20 operate similarly to cause alternating current to flow in the motor winding 14, the voltage and frequency of which will be substantially identical to the voltage and frequency in the motor winding 12, but in phase quadrature thereto.

The phase locking connection for maintaining the output of the square wave oscillator 20 either leading or lagging the output of the oscillator 18 by 90° is accomplished by connecting that portion of the primary winding 52 between the taps 73 and 76 of the winding in series opposition to the primary windings 62 and 63. When the side of the primary winding 62 which is connected to the tap 73 of the primary winding 52 is negative, this side of the winding 62 is more positive than the tap 73 of the winding 52. Also, when the side of the winding 63 which is connected to the tap 76 of the primary winding 52 is negative, it will be more negative than the tap 76. Thus, the voltage developed between the taps 73 and 76 is in opposition to the voltage in 62 and 63 of the saturable reactor 60 to provide the quadrature phasing control. When the circuit is initially turned on, the voltage appearing across the primary windings 62 and 63 will occur substantially simultaneously with the voltage appearing across the primary winding 52. Because of the series opposition connections of the windings 62 and 63 with the tapped portion 73 and 76, the primary winding 52 is actually subtracting from the volt-seconds or number of webers generated in the core of the primary windings 62 and 63. Because of the subtractive effect, the amplitude of the voltages are different at a particular instant in time; and because the number of turns of the primary windings in both the reactors 50 and 60 are substantially identical, the voltage level will be the same, with one reactor reaching its saturation point in each cycle before the other one thus causing the 90° phase relationship between windings 12 and 14.

The portion of the motor control system which governs the level of the direct current voltage across the wires 44 and 46 from the output rectifier 80 includes saturable reactors 150 and 152 which are connected in master and slave relationship. The saturable reactors 150 and 152 are standard reset voltage sensitive types, which are described in volume 44, No. 4, at pages 529 through 532 of a publication entitled Proceedings of the Institute of Radio Engineers, to which reference may be made for a more complete description thereof. The output from the reactors 150 and 152 is connected to the tetrode transistors 90 and 92, respectively, by wires 156 and 154 for properly gating the bridge rectifier 80. The power for the reactors 150 and 152 is taken from the alternating voltage source 82 through the over-voltage protection apparatus 84 by means of wires 158 and 160, across which are connected primary windings 162 and 164 of the reactors, respectively. The output of the reactors 150 and 152 are controlled by an amplifier 166, the output of which is connected to the saturable reactor 150 by means of wires 168 and 170. The output of the amplifier 166 is controlled by a speed control potentiometer 179 connected in series with a sensitivity control potentiometer 172. The potentiometer 179 subtracts the voltage drop occurring across the resistor 70 that is in series with the motor winding 12 and obtained from the output of a sensitivity control potentiometer 172, from a reference voltage which is obtained directly from the line voltage through a reference voltage rectifier 175.

The voltage developed across the resistor 70, the amplitude of which depends on the voltage in the motor winding 12 is conducted through the wire 120 to a rectifier 180 and a capacitor 182 which stores the rectified voltage. This direct current voltage is then applied across a resistor 184 in the sensitivity control potentiometer 172. A direct current reference voltage is developed through the conventional rectifier 175 across resistor 186 in the speed control potentiometer 179. A portion of the voltage developed across the resistor 184 is added in series by means of a wire 188 to a portion of the reference voltage that is developed across the resistor 186. The combination of these two voltages is applied to the base of transistor 190 in the amplifier 166 over a wire 192. The reference voltage from the rectifier 175 and the feedback voltage from the sensitivity control potentiometer 172 are subtractive so that for a constant speed a difference voltage across wires 168 and 170 of the amplifier 166 will be of constant value. It is apparent that this difference voltage from the output of the amplifier 166 to the saturable reactor 150 will be of a large value when the motor 10 is operating at a relatively high speed and at a relatively low value when the motor is operating at a slow speed.

The synchronizing voltage is applied to the primary windings 164 and 162 of the reactors 150 and 152, respectively, from the output of the voltage protection apparatus 84 which causes an induced voltage in a secondary winding 194 and also in a secondary winding 196. In the reactor 150, the D.C. voltage from the amplifier 166 is flowing through the secondary winding 194 and a primary winding 198 and a rectifier 200. Thus, the actual voltage appearing across the primary winding 198 is the difference between the induced voltage in the winding 194 and the voltage from the amplifier 166. This voltage produces sufficient volt-seconds or webers to reset the core of the reactor. The amplitude of the direct current voltage bias from the amplifier 166 places the core relative to its reset point, thereby determining the number of volt-seconds required to accomplish the reset. In the subsequent half cycle of operation the reset core is saturated in the same number of volt-seconds. The sine wave voltage induced in secondary winding 202 occurs at the same time that a voltage is induced in winding 204 by winding 198. When the saturation point of the core of the reactor 150 is reached, the winding 204 will be short circuited and for the remainder of the half cycle period a current will be developed which will follow the voltage waveform induced in winding 202. A slight voltage drop occurs because of inherent resistances in the circuit. The output voltage is of positive polarity during this time because of the rectifier 206 inserted in the secondary circuit. The current developed is flowing through the load resistor 208 and produces a voltage pulse across this resistor 208.

Similarly, the saturable reactor 152 produces output current through a rectifier 212 and a resistor 214. The voltage appearing across the resistor 214 will have the same shape as that of the output current wave form. The input to the reactor 152 is supplied by the output from the reactor 150. Because the reactor 152 is connected in slave relationship with the reactor 150 so that the saturation of the reactor 150 causes the reset in the core of reactor 152, the output current through a resistor 216 of the reactor 152 will be 180° out of phase with the output current through resistor 208 of the reactor 150. Thus, since the transistors 90 and 92 conduct only when a pulse of positive potential is applied to the P gate terminal of their respective transistors, the gating voltage to the bridge circuit 80 is synchronized with the applied voltage. For example, when bus 86 goes positive, the primary winding 164 of the reactor 150 is positive at one end, and consequently the same end of the secondary 202 is positive. Current then flows through the diode 206 after saturation occurs which establishes a positive polarity at the lower end of the resistor 208 as viewed in FIG. 2A. This positive polarity is conducted directly to the P gate terminal of the transistor 90 through the resistors 220 and 222. Similarly, when bus 88 goes positive, the right-hand end of primary winding 162, as viewed in FIG. 2A, goes positive, thus causing a similar induced voltage in secondary winding 224, which permits current to flow through the diode 226 when the core is saturated. This establishes a positive polarity at the lower end of the resistor 216 as viewed in FIG. 2A. This pulse of positive polarity is transferred directly to the P gate terminal of the transistor 92 through resistors 228 and 230.

The length of time during each half cycle that the transistors 90 and 92 of the bridge circuit 80 conduct, as controlled by the duration of the positive pulses in wires 156 and 154 respectively from the output of the saturable reactors 150 and 152, which gates the transistors 90 and 92, governs the level of the D.C. voltage across the wires 44 and 46. The saturable reactor 150 controls the gating of transistor 90 to control the level of D.C. energy across wires 44 and 46 during one half cycle period; and the saturable reactor 152 controls the gating of the transistor 92 to control the level of D.C. energy during the next half cycle, thus producing a full-wave controlled rectification across the output of the bridge rectifier 80.

The over-voltage protection device 84 which is inserted in the output of the alternating voltage power source 82 protects the system against excessive transient voltage surges by causing circuit breaker contacts 239 to open when an over-voltage is present. The device 84 includes a bridge rectifier 240 connected diagonally across the output buses or wires 86 and 88. A capacitor 242 is connected across the other diagonal of the bridge 240. Also connected across the other diagonal is a circuit, which includes a circuit breaker coil 244 for opening the contacts 239 when energized, a current limiting resistor 246, and the emitter collector terminals of a transistor 248 all connected in series. Biasing resistors 252 and 250 are connected between the base and emitter, and base and collector terminals, respectively, of the transistor 248. A zener diode 254 is connected between a diagonal of the rectifier 240 and the base of the transistor 248. The alternating current across wires 86 and 88 is rectified by the rectifier 240. This rectified voltage which appears across the capacitor 242 is applied across the circuit breaker coil 244, through the current limiting resistor 246 and the emitter collector terminals of the transistor 248. Also, this rectified voltage is applied through the resistors 250 and 252, which serve as a voltage divider to properly bias the base of the transistor 248 so that it is normally nonconductive when the voltage from the source 82 is normal. Also, diode 254 is so connected in the circuit that it is drawing a very small leakage current when the voltage from the source 82 is normal. When an excessive voltage surge occurs, the zener diode 254 conducts to cause the transistor 248 to be conductive. The conduction of the transistor 248 permits a sufficient amount of current to flow through the circuit breaker 244 to open its contacts 239 thereby disconnecting the power source 82 from the system. When the source voltage is removed from the bridge 240, the capacitor 242 will start to discharge. This discharge of the capacitor 242 will be fairly slow because inductors 260 and 262 supply an inductive discharging current to the bridge 240. When the capacitor 242 is discharged, the transistor 248 ceases conduction and the zener diode 254 is restored to its nonconductive state. This opens the circuit for the circuit breaker coil 244 which will cause the contacts 239 to close after a delay which is caused by the parallel connected capacitor 264. Thus, the contacts 239 will close after a certain time interval and remain closed if the excessive voltage surge is not present, but will reopen again if the excessive voltage still exists from the power source 82.

Figure 3:
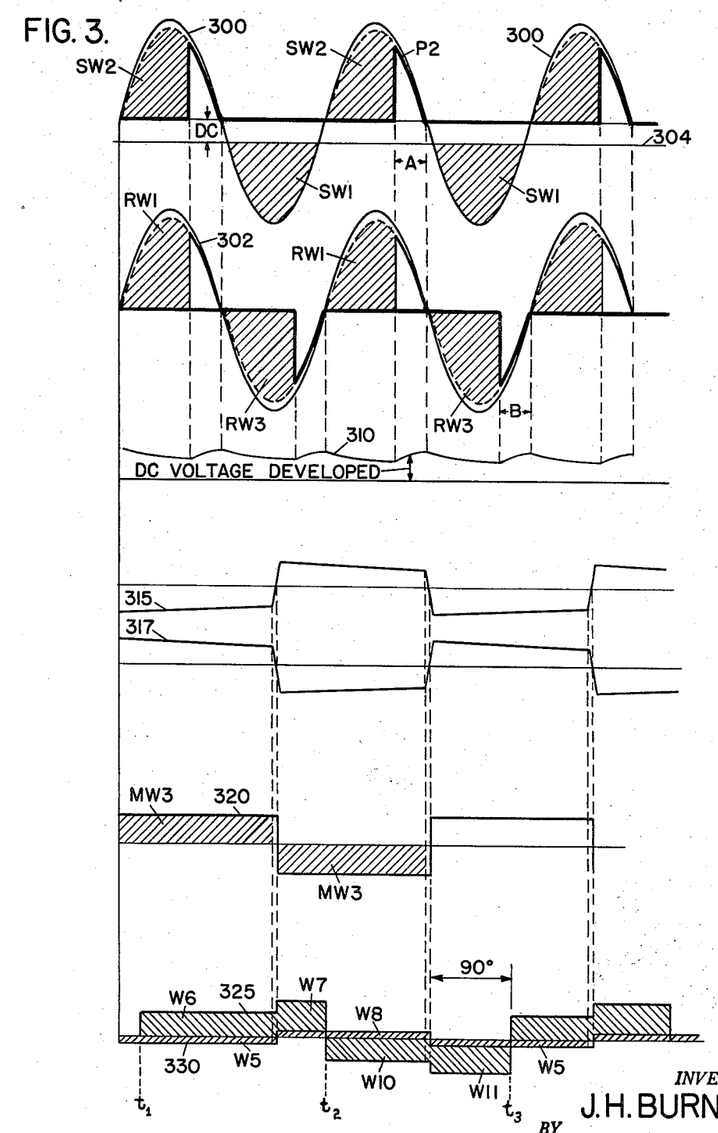
FIG. 3 is a chart of the various voltage and current waveforms in the system for a relatively slow operating speed of the motor, and also showing the phase relationship between the windings of the motor.
Figure 4:
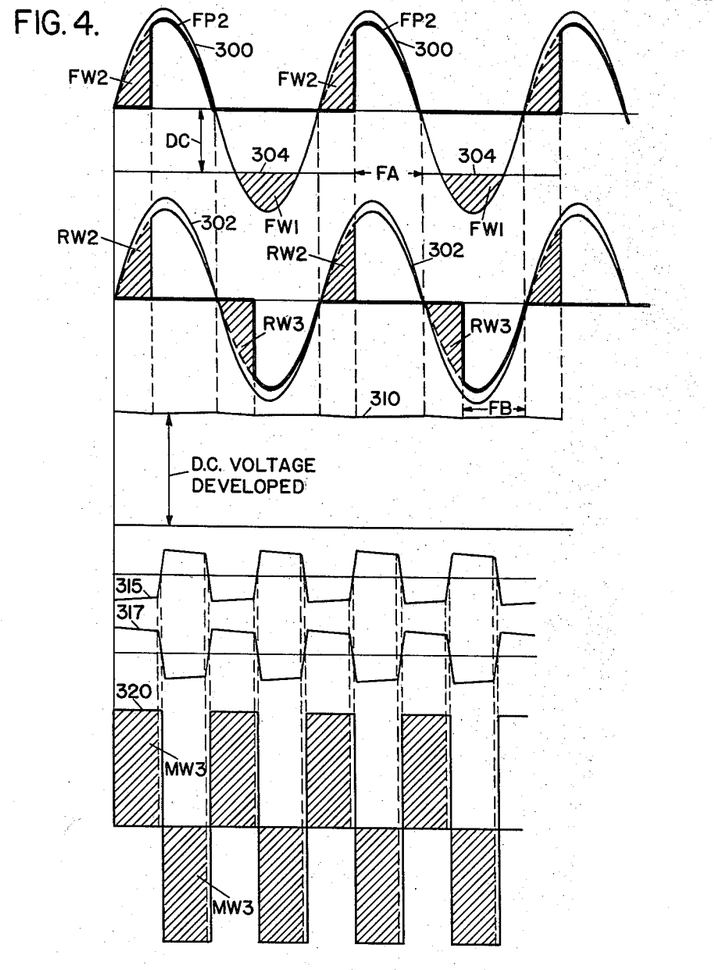
FIG. 4 is a chart of the various voltage and current waveforms in the system for a relatively fast operating speed of the motor.

Referring to the charts of FIGS. 3 and 4, wherein FIG. 3 shows a set of conditions for a predetermined slow rate of speed and FIG. 4 illustrates a set of conditions for a fast rate of speed, the sine waveform denoted at 300 represents the input from the voltage source 82 to the master reactor 150 and the sine waveform denoted at 302 represents the input to the slave reactor 152 from the voltage source 82. The line denoted at 304 represents the level of the feedback voltage from the amplifier 166. In FIG. 3 it will be noted that the D.C. voltage level 304 is shown at a lower level or closer to zero than the level 304 shown in FIG. 4. Therefore level 304 in FIG. 3 intersects the sine wave voltage 300 closer to its base than the level 304 in FIG. 4, requiring a greater number of volt-seconds or webers denoted by the area referred to at SW1 during one half cycle to reset the core of the reactor 150 than the number of webers denoted by the area referred to at FW1 in FIG. 4 to reset the core of the reactor 150. Therefore the volt-seconds denoted by the area referred to at SW2 in FIG. 3 required to saturate the core of the reactor 150 is greater than the volt-seconds referred to by the area FW2 in FIG. 4. The time necessary to saturate the core during a half cycle determines the amplitude of the voltage pulse at the output of the reactor 150. Thus, in FIG. 3, the portion of the sine wave denoted at P2 is the actual output current of the reactor 150 for a relatively low value of the D.C. level 304, and in FIG. 4 the portion of the sine wave denoted at FP2 is the output current for a relatively high level of the D.C. level 304. As is apparent in FIGS. 3 and 4, the time in each half cycle during which the current flows which is denoted at A in FIG. 3 is less than the time denoted at FA in FIG. 4 during which the current flows in each half cycle.

In the slave saturable reactor 152, the volt-seconds denoted by the areas referred to at RW1 in FIG. 3 and RW2 in FIG. 4 for resetting the core is controlled by the volt seconds SW2 and FW2 respectively which saturate the core of the reactor 150. Since the saturation time of the core is the same as the reset time, the volt-seconds required to saturate the core of the reactor is the same. Thus, the volt seconds referred to by the area denoted at RW3 in FIG. 3 is the same as the volt-seconds RW1 in FIG. 3, and also in FIG. 4 the areas RW3 are the same as RW2. The output current of the slave reactor 152 occurs for the time denoted at B in FIG. 3 and FB in FIG. 4. It is apparent that the times A and B in FIG. 3 are of equal duration, and the times FA and FB in FIG. 4 are of equal duration; and the output current A and B or FA and FB occur in adjoining half cycles.

The output pulse corresponding to time A gates the transistor 90 and the output pulse corresponding to time B gates the transistor 92 in the bridge circuit 80 for controlling the motor at a relatively low rate of speed, and the output pulses corresponding to times FA and FB in FIG. 4 gate the transistors 90 and 92 respectively, for controlling the motor at a relatively fast rate of speed. The output pulses of the reactors 150 and 152 in adjoining half cycles cause the bridge 80 to have a direct current output denoted by the waveform 310. In FIG. 3 the pulses corresponding to A and B produce a waveform 310 of relatively low value, and in FIG. 4, the pulses corresponding to FA and FB, of relatively high value.

The value of the voltage waveform 310 controls the frequency of the oscillators as previously described. In FIG. 3 waveforms 315 and 317 show the biasing energy for switching the diagonally opposite transistors in the bridge portion of one square wave oscillator, such as 18 for example, at a relatively slow frequency, and in FIG. 4, the waveforms 315 and 317 are illustrated for a relatively high frequency. The waveform 320 in FIGS. 3 and 4 shows the current flowing through each half cycle in the primary winding 52 of the reactor 50 for a relatively low rate of motor speed and a relatively fast rate of motor speed, respectively. Since the primary winding 52 is in parallel with the motor winding 12, the waveforms are similar. The voltage 320 applied to the primary winding 52 is of one polarity until the waveforms 315 and 317 cross the zero reference point when switching of the transistors occur, then the voltage 320 is applied in the other direction until waveforms 315 and 317 again cross the zero reference line to again switch the transistors. The time that the voltage 320 is of one polarity or the other is controlled by the volt-seconds required to saturate the core of the reactor 50. This time is dependent upon the level of the voltage 310. Thus in FIG. 3 the frequency or reversal of applied voltage 310 and also voltage 320 is slower than shown in FIG. 4. The frequency is proportionate to the applied voltage in the reactors 50 and 60 according to the formula:

$$F = \frac{E}{4N\phi_s}$$

where $E = s$ the voltage applied to the primary winding 52, for example; and $N = s$ the total number of primary turns, and $\phi_s = s$ the saturation flux. It should be noted that the same number of volt-seconds referred to by the area denoted at MW3 are equal in both FIGS. 3 and 4. The level of the current 310 merely causes quicker saturation of the core to change the frequency.

Referring to waveforms 315 and 317, it is apparent that 315 goes positive in one half cycle and 317 goes positive in the next half cycle, thus causing alternate firing of the positive switching transistors in the oscillator 18.

The operation of the oscillator 20 is similar to the operation of oscillator 18 except the reversals of applied voltage to the winding 14 and the primary windings 62 and 63 are either leading or lagging the phase of winding 12 by 90°. This waveform is illustrated in FIG. 3 at 325; and the subtracting portion of the winding 52, as previously described, is denoted at 330.

When the circuit is initially turned "on," the voltage appearing across the primaries 62 and 63 will occur at substantially the same time as that across the primary 52. Due to the series opposing winding, at some time thereafter, such as a cycle or two, the waveform of 325 will lag the waveform 320 because the number of webers denoted at W5 are being subtracted from the number of webers W6 which are in the primary windings 62 and 63. This area W5 is generated as part of the area MW3 because it is a portion of this winding, however, it is reversed in polarity due to the hereinbefore described series opposition connection. If wires 72 and 75 are reversed, rather than being in a series opposition connection, the voltage generated across the transformer between taps 73 and 76 would then be in series aiding form. Such a reversal of connection at this point would cause the waveform 325 to lead the waveform 320 and the motor would run in the opposite direction.

After several cycles have elapsed, the beginning of the switching period for the area W6 to be generated starts. When the area MW3 reaches its saturation point, the area W5 closes, because this area W5 is a portion of the area MW3. Now after switching occurs, the area MW3 will be reversed as shown in the waveform 320, and as a result, an area shown as W8 will be developed on the positive side of the axis. For a short period of time the area W7 being developed by the primary 52 is now aiding this quantity of webers, and therefore the combined areas W6 and W7 approach the time when saturation in the core 60 will result. This time is indicated on the waveform chart at $t2$, and it should be noted that this time $t2$ is farther advanced within the half cycle period than the time $t1$ had been. After this switching period at time $t2$, the same series opposition again takes place, this time between the number of webers indicated by the area W8 as opposed to the area indicating the number of webers W10. Since the time $t2$ was further advanced within this half cycle than $t1$ had been, it will be noted that a lesser quantity of webers, the latter portion of W8, will be subtracted from those generated in W10. This will mean that the switching time of waveform 320 will occur sooner with respect to the area W10 than it did with respect to the area W6 in the half cycle; consequently, a lesser total quantity of webers will be accumulated within the core 60 by the time this switching occurs. After this switching area W11 will be adding to the number of webers W5. However, this area W11 will again be stretched to a later time $t3$ within the half cycle than $t2$ had been within its respective half cycle. In this manner stabilization will be produced at some point midway between the switching points for winding 12, therefore this voltage waveform 325 will eventually be 90° lagging the voltage waveform 320. The voltage 325 is applied across the winding 14 of the motor, therefore winding 14 is locked in quadrature with the winding 12.

It should be noted that the amplitude of the voltage waveform 320 in FIG. 4 for a fast rate of speed is greater than the amplitude of the waveform FIG. 3 for a slow rate of speed. This amplitude is taken in the form of a voltage drop across the resistor 70 and, as previously described, determines the level of the voltage 304, as previously described, for determining the level of the D.C. voltage 310 which controls the frequency in the windings 12 and 14.

When the motor 10 is running at a constant rate of speed, the difference voltage from the output of the amplifier 166, the waveform of which is denoted at 304 in FIGS. 3 and 4 will be of a definite value according to the setting of the speed control potentiometer 179. However, in the event that the motor slows down such as when the load is increased, the current in the motor winding 12 will increase, thus increasing the voltage drop across the resistor 70. As the voltage drop increases it drives the difference voltage to a more negative value, which drives the D.C. voltage, which is denoted at 310 in FIGS. 3 and 4 to a more positive level, thus increasing the frequency in the motor windings. When the load is decreased, the current in the motor winding 12 decreases, and reduces the voltage drop across resistor 70 which makes the D.C. voltage 304 less negative, thus lowering the level of the D.C. voltage 310, thereby slowing up the motor to the controlled speed.

Thus, I have provided a system for controlling an induction motor by varying its frequency, which system controls the speed of the motor in a stepless manner without depending on slip, with minimum copper heat, hysteresis, and eddy current losses. Moreover I have provided a servo system wherein the voltage level in one motor winding provides the feedback for varying the direct current control voltage that governs the frequency applied to the motor winding. Further, I have provided a servo system wherein the voltage applied to the motor windings is proportionate to the frequency so that the magnetic flux in the motor is substantially constant to provide a constant rated motor torque, and thus provides the induction motor with the desirable characteristics of a separately excited D.C. motor with a constant flux and variable armature voltage.

Having thus shown and described one embodiment of this invention, it is to be understood that various modifications, adaptations, and alterations may be applied to the form shown without in any manner departing from the spirit or scope of the present invention except as limited by the appending claims.

What I claim is:

1. A system for controlling the speed of an induction motor having at least two windings, said system comprising inverter means operative to produce an A.C. output voltage in operative phase relationship in response to a D.C. input voltage, said inverter means being operative to vary the frequency of the output voltage in accordance with the level of the D.C. input voltage and also being operative so that the amplitude of the output voltage is proportional to the frequency of the output voltage, means electrically connected operatively to provide a D.C. input voltage at a predetermined level to produce an output voltage of a particular frequency and amplitude, and means for electrically connecting operatively the output of said inverter means to the windings of the motor to operate the motor at a speed in accordance with the frequency of the output voltage.

2. A system according to claim 1 further including feedback means electrically connected operatively to the inverter means effective to vary the level of the D.C. voltage in response to the amplitude of the A.C. voltage to operate the motor at a constant predetermined speed.

3. In a system for controlling the speed of an induction motor in accordance with the frequency of an A.C. voltage, comprising inverter means operative to energize the windings of the motor with an A.C. voltage in operative phase relationship in response to a D.C. input voltage, the frequency of said A.C. voltage being dependent upon the level of said D.C. input voltage, and feedback means responsive to the amplitude of the A.C. voltage in one motor winding effective to vary the D.C. input voltage of said inverter means to vary the frequency of the A.C. voltage to control the motor at a constant predetermined speed.

4. In combination, an induction motor having at least two windings, inverter means operatively connected electrically to the motor windings effective to apply at least a two-phase alternating current output in operative phase relationship to the motor windings in response to a D.C. voltage input, the frequency of said alternating current output being variable as caused by said inverter means in response to the level of said D.C. voltage input rectifying means operatively connected to provide the D.C. voltage input to said inverter means in response to an A.C. voltage, and means operatively connected electrically to said rectifying means to vary the D.C. voltage level to the input of said inverter means to control the speed of the motor in accordance with the frequency of the A.C. voltage produced by said inverter means.

5. A system for controlling the speed of an induction motor having at least two windings, said system comprising inverter means operative to produce at least a two phase alternating current output in operative phase relationship in response to a D.C. voltage input, the frequency of the alternating current output being variable as caused by the inverter means in response to the level of the D.C. voltage input, means for connecting the alternating current output of one phase to one motor winding and means for connecting the alternating current output of another phase to another motor winding, means operable to adjust the D.C. input voltage at a predetermined level, and feedback means responsive to the level of the voltage output of one phase from said inverter means connected electrically to said voltage level adjusting means to control the level of the D.C. input voltage to maintain the motor at a predetermined speed.

6. A system for controlling the speed of an induction motor having at least two windings, said system comprising a first oscillator, a second oscillator, said first and second oscillators each being operative to produce an A.C. output voltage in desponse to a D.C. input voltage, the frequency of the output voltage being dependent on the level of the D.C. input voltage, means for connecting the input of said first and second oscillators to a common source of D.C. voltage, means connecting said first and second oscillators to one another to produce a voltage of one phase at the output of a first oscillator and a voltage of another phase in operative relationship to the first named phase at the output of said second oscillator, means for connecting one winding of the motor to the output of the first oscillator and means for connecting another winding of the motor to the output of the second oscillator, speed control means operatively connected electrically to fix the amplitude of the D.C. voltage at a predetermined level, and feedback means operatively connected electrically to said first oscillator to vary the level of the D.C. voltage in response to the amplitude of the A.C. voltage to maintain the motor at a predetermined speed.

7. A system as claimed in claim 6 wherein the feedback means includes a resistor connected to the output of the first oscillator in series with said one motor winding connecting means.

8. A system for controlling the speed of an induction motor having at least two windings, said system comprising a first oscillator, a second oscillator, said first and second oscillators each having a saturable reactor portion and a bridge portion, electronic valve means connected electrically in each arm of said bridge portions, means for connecting one winding of the motor across one diagonal of the bridge portion of said first oscillator, means for connecting another winding of the motor across one diagonal of the bridge portion of said second oscillator, each reactor portion having a primary winding connected electrically across a respective said one diagonal, means connecting a source of D.C. voltage across the other diagonal of the bridge portions of both oscillators, a first means inductively coupling said electronic valve means in two adjacent arms of each bridge portion of the primary winding of its respective oscillator to cause current to flow through said valve means from said source in one direction through said motor windings and said primary windings, a second means inductively coupling the electronic valve means in the other two adjacent arms of each bridge portion to its respective primary winding to cause current to flow through said valve means from said source in the other direction through the motor windings and the primary windings, the level of the voltage from said D.C. source controlling the frequency of the reversal of current in each respective motor winding and primary winding as governed by the saturable reactor portion, means connecting the primary winding of the reactor portion of the first oscillator to the primary winding of the reactor portion of the second oscillator to cause the current to flow in each motor winding in operative phase relationship to one another, and speed control means connected to said D.C. voltage source for varying the level of the voltage across said other diagonals of both bridge portions.

9. A system for controlling the speed of an induction motor having at least two windings, said system comprising a first oscillator, a second oscillator, said first and second oscillators being operative to produce an A.C. voltage output in response to a D.C. voltage input, the frequency of the output voltage being controlled by the level of the D.C. input voltage, means connecting said first and second oscillators to one another electrically to produce an output voltage of one phase from the first oscillator and an output voltage of another phase from the second oscillator in operative relation to the first named phase, means for connecting one winding of the motor across the output voltage of said first oscillator and means connecting another winding of the motor across the output voltage of the second oscillator, a full wave bridge rectifier, means connecting the first and second oscillators diagonally across said rectifier to provide said D.C. input voltage, means for connecting a source of single phase alternating current across the other diagonals of said bridge rectifier, electronic valve means in two adjacent arms of said bridge rectifier, said electronic valve means being normally closed to prevent the conduction of alternating current through said bridge, and speed control means connected electrically to said electronic valve means to alternately open and close the electronic valve means in said two arms of the bridge to control the level of the D.C. voltage to said first and second oscillators.

10. A control system as claimed in claim 9 wherein a feedback means is connected electrically in series with the alternating voltage output of said first oscillator and connected electrically to said speed control means, whereby the motor is controlled at a predetermined rate of speed.

11. In combination, an induction motor having at least two phase windings, a resistor connected in series with said windings, a first oscillator connected across the resistor and said one winding, a second oscillator connected across the other winding, said first and second oscillators being operative to energizing their respective windings with alternating current, the frequency of said alternating current varying proportionally to an applied D.C. voltage supplied to the oscillators, means connecting said first and second oscillators to one another electrically to produce an alternating current in said one winding that is operatively in phase relationship with the alternating current in the other winding, means for supplying the applied D.C. voltage to said first and second oscillators, means including said applied D.C. voltage supply means to adjustably vary the level of the applied D.C. voltage for controlling the frequency of the alternating current in the motor windings, and feedback voltage means connected electrically between said resistor and said voltage adjusting means to control the level of the applied D.C. voltage in accordance with the amplitude of the voltage across said resistor to maintain the motor at a predetermined speed.

12. A combination is claimed as in claim 11 wherein the means for supplying the applied D.C. voltage is a full wave bridge rectifier having a pair of electronic valve means in adjacent arms of said bridge rectifier and having a source of single phase alternating current connected electrically across one diagonal of said bridge rectifier, and wherein the means for adjustably varying the level of the applied D.C. voltage is a pair of saturable reactors connected to the electronic valve means to cause said valve means alternately to conduct for a predetermined time during each cycle for governing the level of the applied D.C. voltage, and means for controlling the output of said reactors.

13. A combination as claimed in claim 11 wherein said first and second oscillators each have a bridge portion, and said one motor winding and said resistor are connected diagonally across the bridge portion of the first oscillator, and said other winding is connected diagonally across the bridge portion of the other oscillator.

14. A combination as claimed in claim 13 wherein said first and second oscillators each have a saturable reactor portion having a primary winding, each said primary winding being connected in parallel with a respective motor winding, thereby providing a voltage in the primary winding of substantially the same amplitude as its respective parallel connected motor winding.

15. A combination as claimed in claim 14 wherein the means for producing the alternating current in said motor windings in operative phase relationship includes a tapped portion of one primary winding connected in series with the other primary winding.

16. A combination as claimed in claim 14 wherein electronic valve means are connected electrically in each arm of each bridge portion and inductive means are connected electrically to said electronic valve means and inductively coupled to the primary winding of its respective reactor portion to cause the electronic valve means to reverse the flow of current through its connected motor winding and primary winding during each cycle, the amplitude of said applied D.C. voltage governing the frequency of the current reversal.

17. A system for controlling the speed of an induction motor having at least two windings, said system comprising inverter means operative to produce at least two phase alternating current output operatively in phase relationship in response to a D.C. voltage input, the frequency of the alternating current output being variable as caused by the inverter means in response to the level of the D.C. voltage input, means for connecting the alternating current output of one phase to one motor winding and means for connecting the alternating current output of another phase to another motor winding, a bridge rectifier operatively connected electrically to supply the D.C. voltage input to the inverter means, means for supplying a single phase A.C. sine wave voltage to said bridge rectifier, a pair of electronic valve means connected in adjacent arms of the bridge rectifier, each said valve means having a control electrode which when energized with voltage one polarity during alternate half cycles of the single phase A.C. sine wave voltage produces the D.C. voltage input to the inverter means, said D.C. voltage level corresponding to the lengths of time during each half cycle that the control electrodes are energized, and speed control means connected to the control electrodes to energize adjustably the control electrodes alternately with a voltage of one polarity for a predetermined time during each half cycle to control the level of said D.C. voltage.

18. A system for controlling the speed of an induction motor as claimed in claim 17 wherein the speed control means is a pair of saturable reactors connected in master and slave relationship, and an adjustable potentiometer controlling the output of the master saturable reactor.

19. A system for controlling the speed of an induction motor according to claim 17 wherein the inverter means comprises a pair of square wave oscillators each having a bridge portion and a reactance portion and means for connecting a motor winding diagonally across a respective bridge portion.

20. A system as claimed in claim 19 wherein the D.C. input voltage is connected across the diagonals of each bridge portion and an electronic valve means is connected electrically in each arm of each bridge portion to conduct current through the bridge in opposite directions through its respective motor winding at a predetermined frequency and a voltage level that corresponds substantially with the voltage level of the D.C. input voltage.

21. A system for controlling the speed of an induction motor having at least two phase windings, said system comprising inverter means operative to produce at least a two phase alternating current output to the motor windings in response to a D.C. voltage input, said inverter means including switching means operative to reverse the current from said D.C. source during each half cycle, and electronic valve means operatively connected electrically in inverse-parallel relationship with said switching means and connected electrically to said D.C. source to conduct current back to said D.C. source during the inductive carry-over of motor current.

22. A system according to claim 21 wherein said switching means are power transistors.

23. A system according to claim 21 wherein said electronic valve means are power diodes.

References Cited in the file of this patent

UNITED STATES PATENTS

| | | |
|---|---|---|
| 2,150,572 | Young | Mar. 14, 1939 |
| 2,995,690 | Lemon | Aug. 8, 1961 |